G. FOX.
PIPE COUPLING.
APPLICATION FILED APR. 9, 1915.

1,301,245.

Patented Apr. 22, 1919.

Witnesses:
Raphael Netter

By his Attorney

Inventor
Gordon Fox

UNITED STATES PATENT OFFICE.

GORDON FOX, OF EVANSTON, ILLINOIS, ASSIGNOR TO ANSON MARK AND CLAYTON MARK, COPARTNERS DOING BUSINESS AS MARK MANUFACTURING COMPANY, OF CHICAGO, ILLINOIS.

PIPE-COUPLING.

1,301,245.

Specification of Letters Patent.

Patented Apr. 22, 1919.

Application filed April 9, 1915. Serial No. 20,108.

*To all whom it may concern:*

Be it known that I, GORDON FOX, a citizen of the United States, residing at Evanston, Cook county, Illinois, have invented new and useful Improvements in Pipe-Couplings, of which the following is a specification, reference being had to the accompanying drawings, in which—

Figure 1:
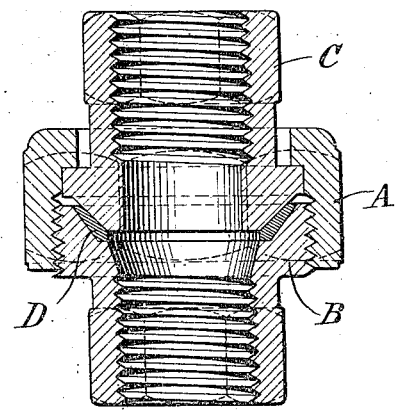
Figure 2:
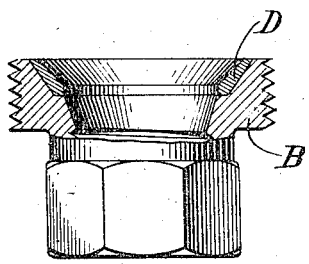

Figure 1 is a section of my improved coupling, and Fig. 2 is a section of the spud or head piece, showing the application of the seat or washer thereto.

My invention relates to pipe couplings or pipe unions, and consists in providing a protective washer composed of a non-corrodible metal, such as brass or copper, the purpose of which is to protect the meeting faces of the union from corrosion. I have found, with washers of the type commonly used in pipe couplings, that, due to the contraction and expansion of the parts, corrosion will occur between the washer and the part to which it is attached, and that, as the corrosion progresses, not only will leaks occur, but the washer will become loosened from the part to which it is attached. I have found that these difficulties are obviated by welding the washer to a pipe coupling part, so that the connection therebetween is not affected by expansion or contraction.

Referring to the drawings, A indicates the coupling nut, B the spud or head piece, C the tail piece and D the washer, which is composed of brass, copper or other suitable non-corrodible metal. I apply the washer D to the part to which it is desired to be attached by placing it in position thereon and then welding it thereto, preferably by electricity. This causes the metal of the washer to flow into the pores of the metal of the pipe coupling part, and insures a permanent union between the two metals, which is not affected by expansion or contraction thereof, since the seat is made integral with the part to which it is attached.

The terms and expressions which I have employed are used as terms of description and not of limitation, and I have no intention, in the use of such terms and expressions, of excluding any equivalent for the features shown and described, but recognize that various structural modifications are possible within the scope of the invention claimed.

What I claim is:

1. A pipe coupling composed of ferrous metal, consisting of a spud, a tail piece, a coupling nut, and a washer composed of a non-corrodible metal interposed between the meeting faces of the spud and head piece and made integral by welding to one of the parts and adapted to protect said meeting faces from corrosion, said washer being of sufficient thickness or body to adapt it to yield to such a degree as to compensate for irregularities of contact in the faces of opposing surfaces.

2. A pipe coupling composed of ferrous metal, consisting of a spud, a tail piece, a coupling nut, and a non-corrodible washer element permanently united by welding to one of the meeting faces of the coupling and being adapted to prevent corrosion between said faces, said washer being of sufficient thickness or body to adapt it to yield to such a degree as to compensate for irregularities of contact in the faces of opposing surfaces.

GORDON FOX.